(12) United States Patent
Besson et al.

(10) Patent No.: US 11,175,392 B2
(45) Date of Patent: Nov. 16, 2021

(54) MODEL-BASED IMAGE RECONSTRUCTION METHOD

(71) Applicant: ECOLE POLYTECHNIQUE FEDERALE DE LAUSANNE (EPFL), Lausanne (CH)

(72) Inventors: Adrien Besson, Marseilles (FR); Dimitris Perdios, Lausanne (CH); Marcel Arditi, Aïre (CH); Jean-Philippe Thiran, Granges (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/641,234

(22) PCT Filed: Aug. 21, 2018

(86) PCT No.: PCT/EP2018/072579
§ 371 (c)(1),
(2) Date: Feb. 22, 2020

(87) PCT Pub. No.: WO2019/038296
PCT Pub. Date: Feb. 28, 2019

(65) Prior Publication Data
US 2020/0225335 A1  Jul. 16, 2020

(30) Foreign Application Priority Data
Aug. 23, 2017 (EP) .................................. 17187412

(51) Int. Cl.
*G01B 5/18* (2006.01)
*G01S 7/52* (2006.01)
*G01S 15/89* (2006.01)

(52) U.S. Cl.
CPC ...... *G01S 7/52028* (2013.01); *G01S 7/52085* (2013.01); *G01S 15/8915* (2013.01); *G01S 15/8977* (2013.01)

(58) Field of Classification Search
None
See application file for complete search history.

(56) References Cited

U.S. PATENT DOCUMENTS

2008/0100614 A1* 5/2008 Augst ............... G06T 19/006
                                                            345/419
2009/0076387 A1* 3/2009 Simopoulos ........... A61B 8/483
                                                            600/437
(Continued)

FOREIGN PATENT DOCUMENTS

CN      102324106 A    1/2012
CN      103971404 A    8/2014
(Continued)

OTHER PUBLICATIONS

Beck A. et al., "A Fast Iterative Shrinkage-Thresholding Algorithm for Linear Inverse Problems", SIAM Journal on Imaging Science, vol. 2, p. 183-202, 2009.
(Continued)

*Primary Examiner* — Isam A Alsomiri
*Assistant Examiner* — Jonathan D Armstrong
(74) *Attorney, Agent, or Firm* — Maschoff Brennan

(57) ABSTRACT

The present invention concerns a pulse wave image reconstruction method to be used for example in ultrasound imaging. The proposed method is based on an image measurement model and its adjoint operator. The proposed method introduces matrix-free formulations of the measurement model and its adjoint operator. The proposed method has the advantage that the reconstructed image has a very high quality and that it can be reconstructed quickly.

15 Claims, 7 Drawing Sheets

(56) References Cited

U.S. PATENT DOCUMENTS

| | | | |
|---|---|---|---|
| 2009/0182234 A1* | 7/2009 | Perrey | A61B 8/0825 600/443 |
| 2019/0343487 A1* | 11/2019 | Perrey | A61B 8/085 |

FOREIGN PATENT DOCUMENTS

| | | |
|---|---|---|
| CN | 104408772 A | 3/2015 |
| CN | 105069789 A | 11/2015 |
| JP | 2005-342140 A | 12/2005 |
| JP | 2017-104476 A | 6/2017 |

OTHER PUBLICATIONS

S. Boyd, N. Parikh, E. Chu, B. Peleato and J. Eckstein, "Distributed Optimization and Statistical Learning via the Alternating Direction Method of Multipliers", Foundations and Trends in Machine Learning, vol. 3, p. 1-122, 2011.

P. Combettes and J.-C. Pesquet, "Proximal Splitting Methods in Signal Processing", Fixed-Point Algorithms for Inverse Problems in Science and Engineering, p. 185-212, 2011.

J. Combettes, L. Condat, J.-C. Pesquet and BC Vu, "A forward-backward view of some primal-dual optimization methods in image recovery", Proceedings of the 2014 IEEE International Conference on Image Processing, p. 4141-4145, 2014.

N. Pustelnik, C. Chaux and J.-C. Pesquet, "Parallel Proximal Algorithm for Image Restoration Using Hybrid Regularization", IEEE Transactions on Image Processing, vol. 20, p. 2450-2462, 2011.

S. Setzer, G. Steidl and T. Teuber, "Deblurring Poissonian Images by Split Bregman Techniques", Journal of Visual Communication and Image Representation, vol. 21, p. 193-199, 2010.

P. R. Stepanishen, "The Time-Dependent Force and Radiation Impedance on a Piston in a Rigid Infinite Planar Baffle", J. Acoust. Soc. Am., vol. 49, p. 76, 1971.

P. Thévenaz, T. Blu and M. Unser, "Interpolation revisited", IEEE Transactions on Medical Imaging, vol. 19, p. 739-758, 2000.

G. E. Tupholme, "Generation of acoustic pulses by baffled plane pistons", Mathematika, vol. 16, p. 209, 1969.

David Guillaume et al: "Time domain compressive beam forming of ultrasound signals", The Journal of the Acoustical Society of America, American Institute of Physics for the Acoustical Society of America, New York, NY, US, vol. 137, No. 5, May 1, 2015.

Amit Adam et al: "Bayesian Time-of-Flight for Realtime Shape, Illumination and Albedo", Jul. 22, 2015.

Guillaume David et al., "Time domain compressive beam forming of ultrasound signals", The Journal of the Acoustical Society of America, May 2015, vol. 137, No. 5 and pp. 2773-2784.

Ece Ozkan et al., "Inverse Problem of Ultrasound and Beamforming With Sparsity Constraints and Regularization" IEEE Transactions on Ultrasonics, Ferroelectronics and Frequency Control, Mar. 2018, vol. 65, No. 3, pp. 356-365.

Solivan A. Valente et al., "An Assessment of Iterative Reconstruction Methods for Sparse Ultrasound Imaging", Sensors, Mar. 8, 2017, vol. 17, No. 533, pp. 1-133.

JP Office Action in Application No. 2020-511196 dated May 18, 2021.

CN Office Action in Application No. 201880066558.6 dated Jun. 2, 2021.

Admit Adam et al., "Bayesian Time-of-Flight for Realtime Shape, Illumination and Albedo", IEEE Transactions on May 31, 2017, Pattern Analysis and Machine Intelligence, 39, 5.

* cited by examiner

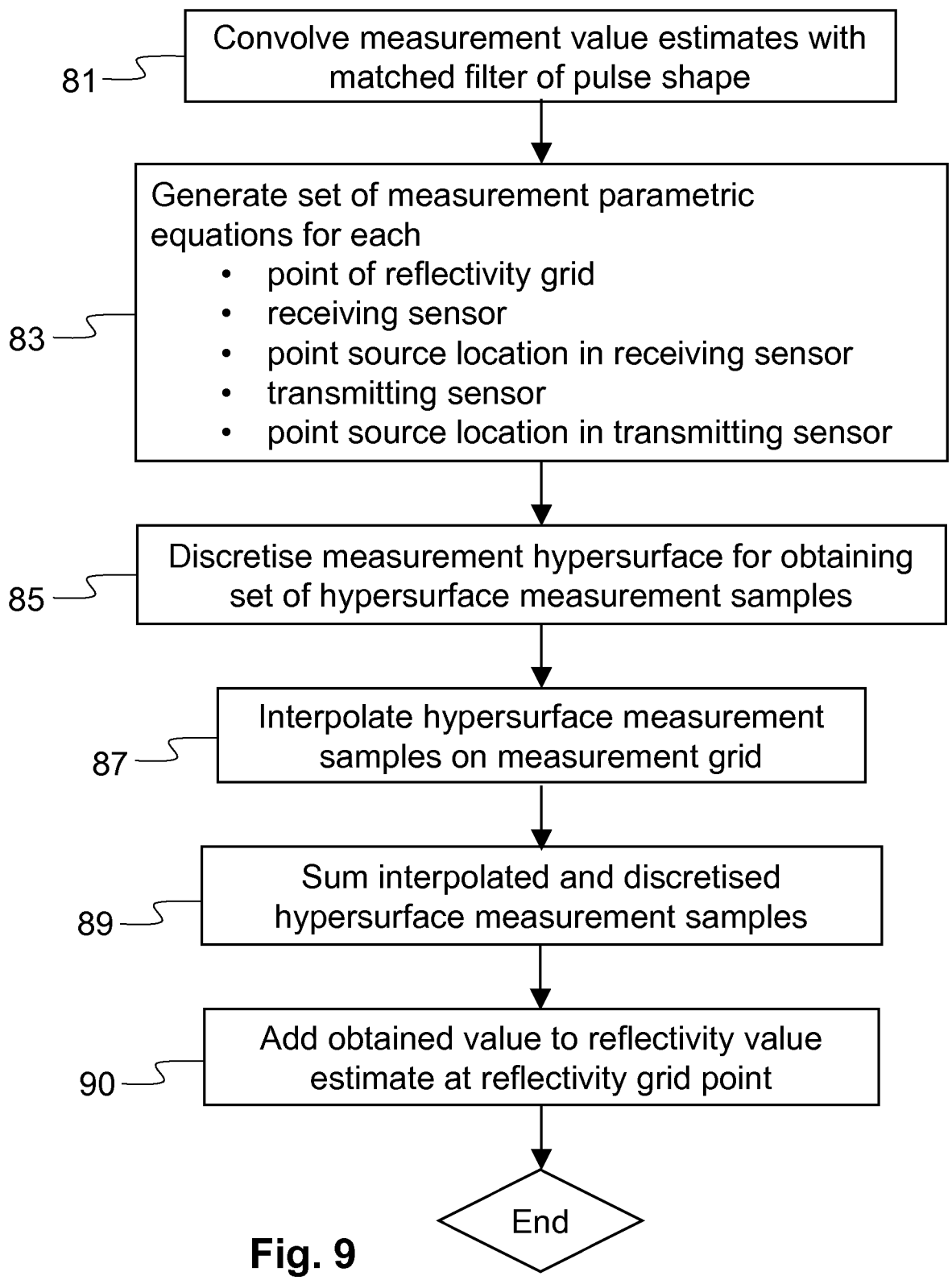

MODEL-BASED IMAGE RECONSTRUCTION METHOD

TECHNICAL FIELD

The present invention relates to a model-based image reconstruction method suitable to be used for example in ultrasound imaging. The invention also relates to an imaging apparatus for carrying out the method.

BACKGROUND OF THE INVENTION

Pulse wave imaging applications, such as ultrasound (US) imaging applications, may be used in various technical fields. In medical applications, it is used to see internal body structures such as tendons, muscles, joints, vessels and internal organs. However, pulse wave imaging techniques are also widely used outside the medical field. One commercial use of ultrasound is non-destructive testing (NDT), which is a process of inspecting, testing, or evaluating materials, components or assemblies for discontinuities, or differences in characteristics without destroying the serviceability of the part or system. In other words, when the inspection or test is completed, the part can still be used. An example of an NDT would be in oil pipes. In this case, ultrasound waves are used to propagate down the pipe, and in this manner, it is possible to detect if there is a crack or defect as a reflection of the pulse. With knowledge of the speed of the wave in the pipe and the time interval between the reflection from the crack and sending the waves, the position of the defect can be estimated. The same theory used for crack detection in pipes can be used to detect cracks in aircraft structures/wing panels etc and to detect the build-up of ice on the surface of the wing for example. There are of course many other possible NDT applications for the pulse wave imaging. Pulse wave imaging has gained popularity, because of its safety, portability and real-time capability.

Classical US imaging uses multiple focused time-separated transmit beams to reconstruct images along scan lines. The frame rate is therefore limited by the number of focused transmit beams and cannot exceed a few tens of images per second. Although this frame rate is sufficient for many applications, the understanding of more complex phenomena, such as the propagation of shear waves for elastography, requires higher frame rates.

One way to overcome this limitation consists in decreasing as much as possible the number of transmit beams. Synthetic aperture (SA) methods try to overcome this problem by using only few transducer elements to sequentially insonify the whole medium. Another option is ultrafast US (UFUS) imaging, which exploits the idea of using plane waves (PW) or diverging waves (DW) to insonify the whole field-of-view at once, allowing US systems to reach thousands of frames per second.

An important limitation of such approaches is a degraded image quality. Indeed, compared to focused transmit beams where the energy is concentrated in a specific region of interest, the energy of a PW or a DW is spread over the insonified medium, resulting in lower signal-to-noise ratio and poor spatial resolution. One way to address this problem consists in averaging multiple images, obtained with different insonification angles in the context of PW imaging and with different point source locations in the context of DW imaging for UFUS or with different groups of transducer elements for SA imaging. In UFUS, this process is called coherent compounding. While the implementation of such a technique is rather simple, it requires multiple insonifications thus reducing the frame rate.

An alternative to averaging multiple insonifications consists in using more efficient reconstruction methods than classical techniques, which revolve mainly around delay-and-sum (DAS) beamforming. One popular group of methods relies on the use of iterative algorithms to solve the ill-posed image formation problem induced by US image reconstruction. These methods are built upon forward models of the problem. The main problem with the known solutions resides in their computational complexity, usually translated into storage requirements of the corresponding matrix representation. Some models proposed require the storage of several hundreds of giga bytes for matrix coefficients in two dimensions (2D). This issue severely limits the appeal of the iterative methods in view of the classical approaches.

SUMMARY OF THE INVENTION

It is an object of the present invention to overcome at least some of the problems identified above related to image reconstruction in pulse wave imaging.

According to a first aspect of the invention, there is provided an image reconstruction method as recited in claim 1.

The proposed method has the advantage that the reconstructed image has a very high quality and that it can be reconstructed quickly. In other words, compared to prior art solutions, image contrast and resolution can be significantly improved.

According to a second aspect of the invention, there is provided an imaging apparatus configured to carry out the method according to the first aspect of the invention as recited in claim 15.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which:

FIG. 9 is a flow chart illustrating a process of implementing an adjoint operator of the measurement model according to an example of the present invention.

DETAILED DESCRIPTION OF AN EMBODIMENT OF THE INVENTION

Figure 1:
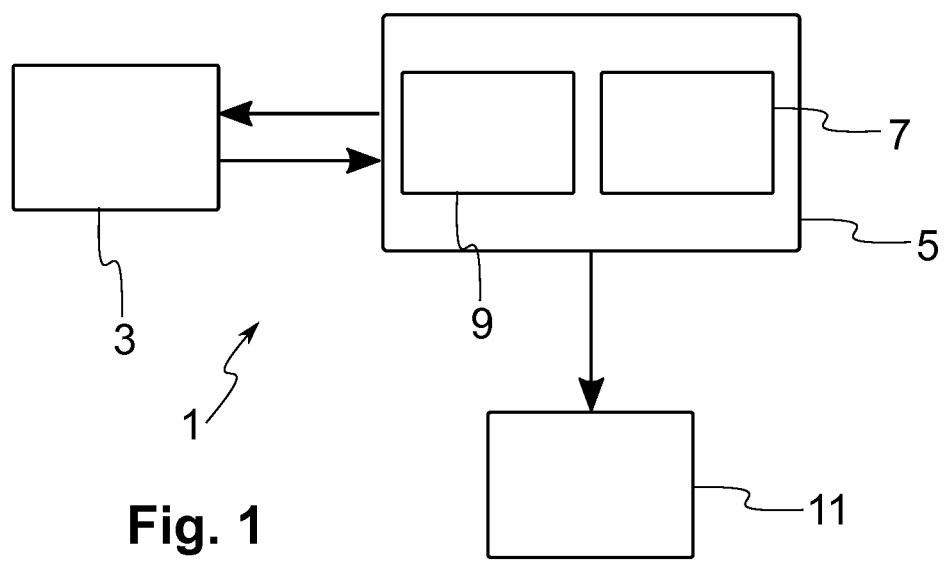
FIG. 1 is a block diagram illustrating some elements of an imaging system, which are useful for understanding the teachings of the present invention, according to an example of the present invention.

An embodiment of the present invention will now be described in detail with reference to the attached figures. This embodiment is described in the context of US imaging, but the teachings of the invention are not limited to this environment. The teachings of the invention are equally applicable in other fields where pulse wave imaging can be used. Identical or corresponding functional and structural elements which appear in the different drawings are assigned the same reference numerals.

The present invention in the present embodiment proposes an image formation method and apparatus or system in the context of 2D and 3D ultrasound imaging based on solving an ill-posed linear inverse problem of the following form:

$$m = H\gamma + n,$$

where m are the measurements, $\gamma$ is the object under scrutiny or more specifically its reflectivity function, H is the measurement model and n is the noise. The proposed image formation method relies on two main pillars: a fast and matrix-free measurement model H and an image reconstruction method which permits to retrieve an estimate of the object under scrutiny $\gamma$ given the measurements m. The object may be an internal part or element of a larger structure. The proposed method can be carried out by a standard US system comprising a US probe, an image formation module and a post-processing and display modules, as described in FIG. 1.

FIG. 1 is simplified block diagram showing some elements of the imaging system or apparatus 1, which are useful for understanding the teachings of the present invention. The system 1 comprises an ultrasound probe 3, which in this example comprises a linear array of piezoelectric elements or sensors, also referred to as transducers. Such a probe is suitable for the purpose of imaging in 2D, and may include a cylindrical focusing scheme to concentrate the acoustic energy, in elevation, in the vicinity of the image plane. However, this kind of probe is merely an example. The proposed method could be easily adapted to different probe geometries (such as convex probes, phased arrays etc) or technologies (including polyvinylidene fluoride (PVDF) copolymers and capacitive micromachined ultrasonic transducers (CMUT) etc). Similarly, the proposed method can be extended to cases using 2D matrix probes, designed to transmit acoustic beams and collect echoes from the insonified volume in order to provide volumetric imaging, whereby the imaging process produces a 3D representation of the volume under scrutiny.

The US probe 3 is connected to an image formation module or apparatus 5, which is configured to carry out the image formation. A measurement model estimated in a measurement model unit 7 is used in the image formation process. The proposed measurement model as explained later in detail is based on a pulse-echo spatial impulse response model. The present invention introduces matrix-free formulations of the measurement model and its adjoint, the adjoint of an operator being defined as a continuous extension of the transpose of a square matrix in the case of a continuous operator, which represent a novel image formation method in pulse wave imaging. The description of the measurement model may be achieved through two main steps:

Parametric equations of the round-trip time-of-flight of the pulse waves are derived. It will be shown that the model can be recast as an integral over hypersurfaces that are specified as explained later.

The proposed integral may then be discretised as described later.

The model may be derived for example for a PW, DW and SA imaging. It is compatible with radio frequency and in-phase and quadrature (IQ) data. Finally, a matrix-free formulation of the adjoint of the proposed measurement model is derived. It will be demonstrated that it can also be recast as an integral over hypersurfaces, defined as 1D manifolds in the case of 2D imaging and as 2D manifolds in the case of 3D imaging, that are parametrised and that the same discretisation scheme as proposed for the measurement model may be used.

The image formation apparatus 5 also comprises an image reconstruction unit 9 for running an image reconstruction process or method. The image reconstruction method aims to retrieve an estimate $\hat{\gamma}$ of the image under scrutiny. The estimate can be written as:

$$\hat{\gamma} = f(m, H, \Xi),$$

where f accounts for the image reconstruction process with hyperparameters $\Xi$. Two different image reconstruction methods are presented in the present description:

Analytical approaches where f(m, H, $\Xi$) has an explicit formulation (eg backpropagation methods using the adjoint operator of H).

Iterative approaches where f(m, H, $\Xi$) is an iterative algorithm, which solves the following problem:

$$\hat{\gamma} = \arg\min_{\gamma} \mathcal{J}(\gamma, m) = \mathcal{F}(H\gamma, m) + \lambda \mathcal{R}(\gamma),$$

where $\mathcal{J}(\gamma, m)$ denotes an objective function which comprises a functional $\mathcal{F}$, also referred to as a data discrepancy term, measuring the error between $H\gamma$ and m, $\mathcal{R}$ denotes a non-negative functional (regularisation) and $\lambda$ denotes a regularisation parameter. In this case, $\Xi$ are the hyperparameters related to the optimisation algorithm used to solve the minimisation problem, eg the number of iterations, the stopping criterion of the algorithm etc.

After image reconstruction, the reconstructed data are sent to a post-processing and display unit or module 11. The post-processing step covers a range of applications, such as B-mode imaging, colour Doppler imaging, vector Doppler imaging and elastography.

For B-mode imaging using RF data, an envelope detection is applied onto the reconstructed data. The envelope detection can, for instance, be achieved by means of the Hilbert transform followed by a magnitude detection and optional low-pass filtering. It can also be achieved by squaring and low-pass filtering the signal. If B-mode imaging is used with IQ data, the magnitude of the signal is extracted. The envelope detection step is followed by a normalisation and dynamics compression steps. For Doppler imaging and elastography, the reconstructed RF or IQ data are directly used without post-processing.

Figure 2:
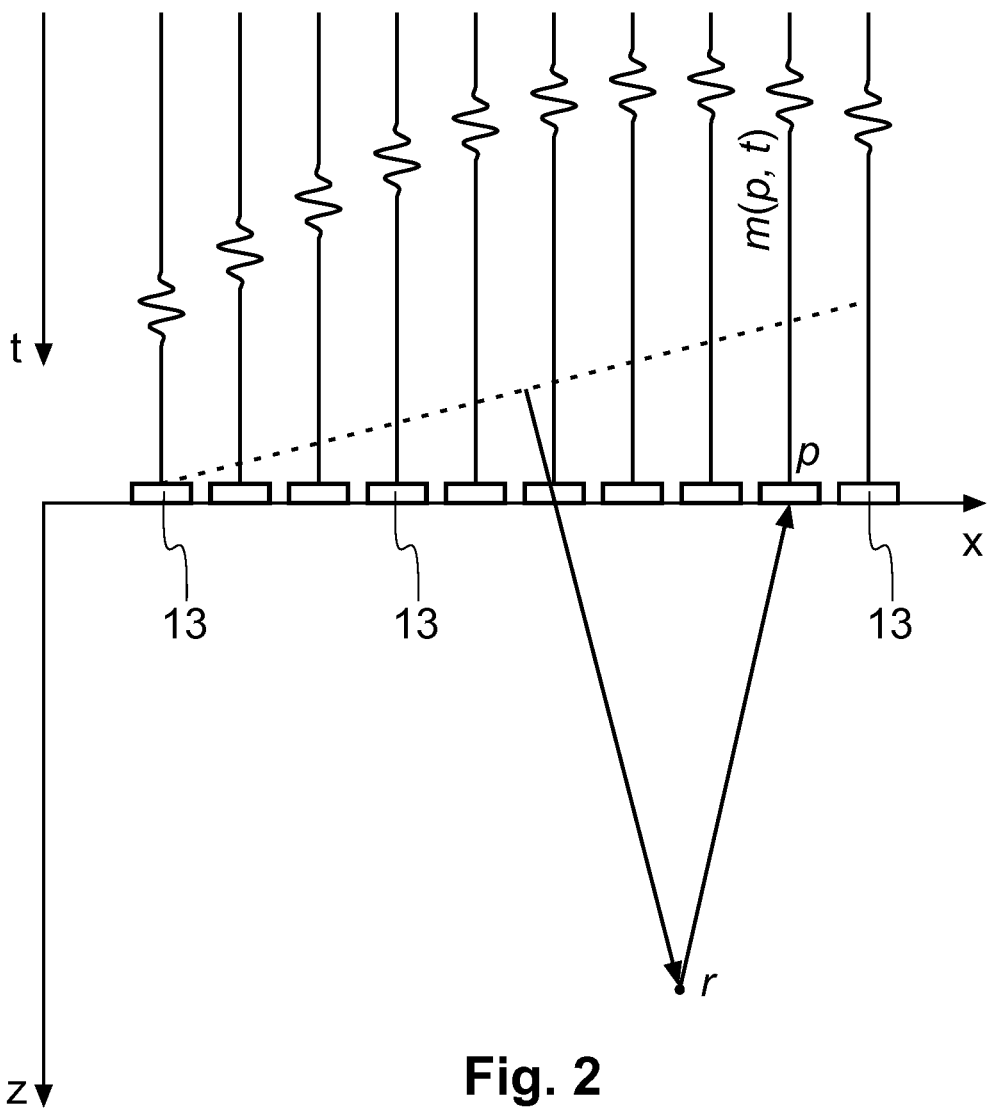
FIG. 2 is a schematic illustration showing the imaging configuration used in the proposed imaging method according to an example of the present invention.

Before explaining the proposed method in detail, some notations used in the present description are explained first. In the pulse-echo configuration considered in the present description, echoes from a medium $\Omega \in \mathbb{R}^3$, characterised by its reflectivity (function) $\gamma(r)$ with $r=[x, y, z]^T \in \Omega$ are detected by sensors 13. FIG. 2 illustrates a specific simplified measurement configuration for PW imaging. The following notations are used throughout the present description:

Mathematical or Similar Notations:
Vectors are denoted with a bold font.

$$\|v\|_p = \sqrt[p]{\sum_{i=1}^{N} |v_i|^p}$$

denotes the $\ell_p$-norm of a vector $v \in \mathbb{R}^N$, where $\mathbb{R}$ denotes the space of real numbers.

The space of the square integrable functions of a Hilbert space W is denoted as $L_2(W)$. The inner product between two functions $f, g \in L_2(W)$ is defined as $\langle f|g \rangle_w = \int_{x \in W} f(x)g(x)dx$.

Ultrasound Related Notations:
m(p, t) is the electrical signal received at a time instant t by the sensor 13 positioned at p. In other words, m(p, t) defines one sample of a continuous set of measurements (equivalently one sample of element raw data), computed at a measurement grid point (p, t).

$\gamma(r)$ defines one value of a set of reflectivity values (equivalently image samples) computed at a reflectivity grid point r.

$\Omega$ denotes the medium or object of interest, ie the continuous set of locations of the reflectivity samples.

o(r, p) is the element directivity between the sensor located at p and the point located at r.

a(r, p) defines the value of the attenuation between a point source located at p and a point located at r.

$v_{pe}(t)$ is the received pulse shape (ie the pulse-echo waveform).

$t_{Tx}(r, q)$ denotes the transmission propagation delay, ie the time taken by the pulse wave transmitted by a transmitting device or element 13 located at q to reach the point located at r.

$t_{Rx}(r, p)$ denotes the receive propagation delay, ie the time taken by the pulse-echo wave transmitted by a point located at r to reach the sensor located at p.

Measurement Grid Related Notations:
A set of transmitting elements: $(X^j)_{j=1}^{N_{elt}}$, where $N_{elt}$ refers to the number of transmitting elements, also referred to as transmitters.

A set of receive sensors: $(\Pi^i)_{i=1}^{N_{elr}}$, where $N_{elr}$ refers to the number of receive sensors, also referred to as receivers.

A set of point source locations inside a transmit element: $X_d^j = \{q^k \in X^j, k=\{1 \ldots N_q^j\}\}$.

A set of point source locations inside a receive sensor: $\Pi_d^i = \{p^n \in \Pi^i, n=\{1 \ldots N_p^i\}\}$.

A set of time samples: $T_d = \{t^l \in \mathbb{R}, l=\{1 \ldots N_t\}\}$.

Reflectivity Grid Related Notations:
A set of locations of reflectivity values: $\Omega_d = \{r^n \in \Omega, n=\{1 \ldots N_\gamma\}\}$ where $N_\gamma$ refers to the number of reflectivity values.

The proposed method defines a first grid and a second grid which both lie in the 3D space. The first grid is referred to as a reflectivity grid, which comprises reflectivity grid points at intersections of two crossing grid lines, which in this example form an angle of substantially 90 degrees with respect to each other. Every reflectivity grid point of the reflectivity grid belongs to the medium $\Omega$. The second grid is referred to as a measurement grid, which comprises measurement grid points at intersections of two crossing grid lines, which in this example form an angle of substantially 90 degrees with respect to each other. The measurement grid points coincide with the locations of the receiving sensors, in one dimension, and with the sampling time instants of each sensor in the other dimension.

Estimation, evaluation, computation or implementation of the measurement model at a given measurement grid point according to the present invention is explained next. In this example, the measurement model is estimated at each measurement grid point. The measurement model used in this disclosure is a pulse-echo spatial impulse response model first introduced by G. E. Tupholme, "Generation of acoustic pulses by baffled plane pistons", Mathematika, vol. 16, p. 209, 1969, and P. R. Stepanishen, "The Time-Dependent Force and Radiation Impedance on a Piston in a Rigid Infinite Planar Baffle", J. Acoust. Soc. Am., vol. 49, p. 76, 1971. According to this model, one can write the below equations which account for the raw data sample recorded at position p and time t.

A continuous parametric formulation of the measurement model for a configuration of one transmitting point source element and one receiving point source sensor is explained next.

The measurement model is defined as:

$$m(p, t) = \int_{r \in \Omega} \frac{o(r, p)o(r, q)a(r, p)a(r, q)}{4\pi^2 \|r-p\|_2 \|r-q\|_2} \gamma(r) v_{pe}(t - t_{Tx}(r, q) - t_{Rx}(r, p)) dr.$$

The above equation can be expressed as shown below, and defines the measurement model as an integral along the hypersurface $\Gamma(p, q, t)$:

$$m(p, t) = \int \int_{\tau \in \mathbb{R}, r \in \Gamma(p,q,\tau)} \frac{o_d(r, p, q)\gamma(r)}{|\nabla_r g|} v_{pe}(t-\tau) d\sigma(r) d\tau,$$

where $$o_d(r, p, q) = \frac{o(r, p)o(r, q)a(r, p)a(r, q)}{4\pi^2 \|r-p\|_2 \|r-q\|_2}$$

$$\Gamma(p, q, t) = \{r \in \Omega \mid g(r, p, q, t) = 0\}$$

$$g(r, p, q, t) = t - t_{Tx}(r, q) - t_{Rx}(r, p)$$

$$|\nabla_r g| = \left|\frac{\partial g}{\partial r}\right|$$

Figure 3:
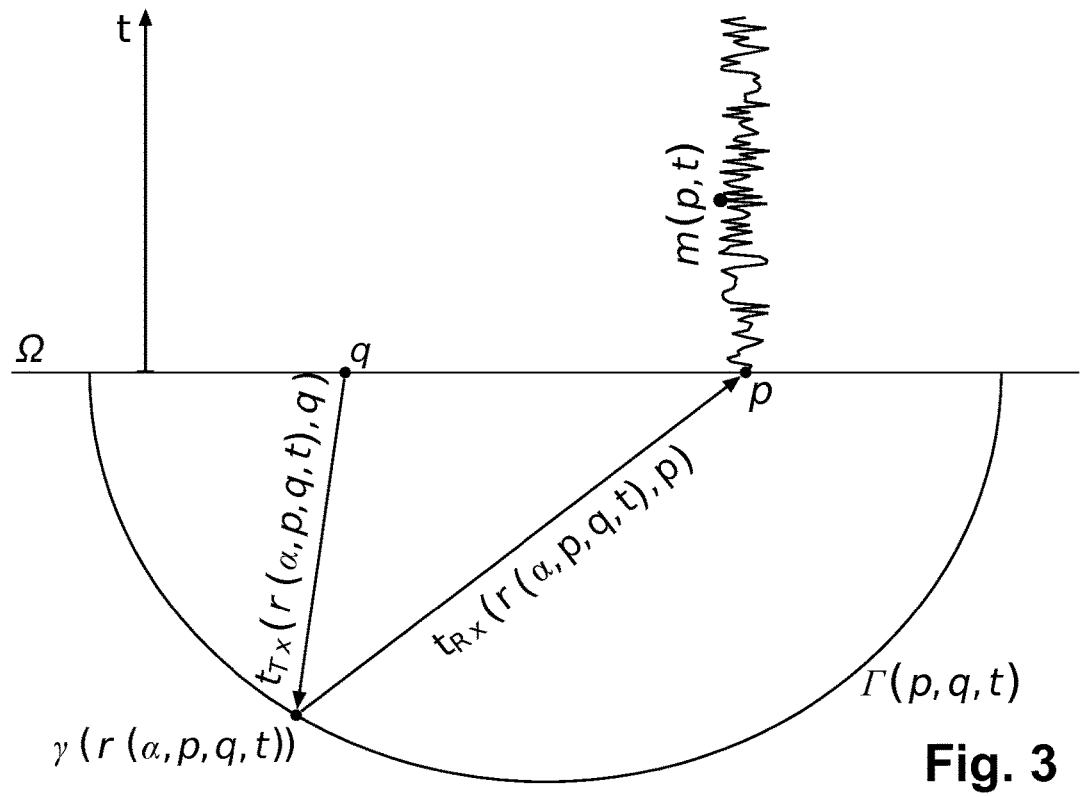
FIG. 3 is a schematic illustration showing the imaging configuration and a continuous domain reflectivity hypersurface used in the proposed imaging method according to an example of the present invention.

In the above equations, the hypersurface, or more specifically a reflectivity hypersurface, is $\Gamma(p, q, t)$, defined by the equation $g(r, p, q, t)=0$, where the variable of interest is r. $\Gamma(p, q, t)$ defines a conic when r lies in the 2D plane (parabola or ellipse) and a quadric when r lies in a 3D volume. The same shapes apply also to the measurement hypersurface. FIG. 3 schematically illustrates the measurement configuration in continuous domain showing also the reflectivity hypersurface.

The reflectivity hypersurface $\Gamma(p, q, t)$ can now be parametrised in order to reduce the integration dimension. The reflectivity hypersurface $\Gamma(p, q, t)$, defined by the equation g(r, p, q, t)=0, can equivalently be defined by a set of reflectivity parametric equations. In mathematics, parametric equations define a set of quantities as functions of one or more independent variables (ie parameters). Parametric equations are commonly used to express the coordinates of the points that make up a geometric object such as a surface or curve, in which case the equations are collectively called a parametric representation or parameterisation of the object. The set of reflectivity parametric equations can now be defined as follows:

$$r \in \Gamma(p,q,t) \Leftrightarrow r = r(\alpha, p, q, t).$$

The equation on the right of the equivalence defines the reflectivity parametric equations of r since r now depends on a parameter $\alpha \in A$, where $A \subset \mathbb{R}$ if $r \in \mathbb{R}^3$ and $A \subset \mathbb{R}$ when $r \in \mathbb{R}^2$. It is to be noted if there is one set of reflectivity parametric equations per measurement value or sample. Furthermore, the hypersurface can be obtained by drawing the set of reflectivity parametric equations. Equipped with the above formulation of the set of reflectivity parametric equations, it is possible to derive the continuous parametric formulation of the measurement model H as follows:

$$m(p,t) = \int \int_{\tau \in \mathbb{R}, \alpha \in A} o_d(r(\alpha, p, q, \tau), p, q)$$

$$\gamma(r(\alpha, p, q, \tau)) |J(\alpha, p, q, \tau)| v_{pe}(t-\tau) d\alpha d\tau,$$

$$\text{where } |J(\alpha, p, q, \tau)| = \frac{|\nabla_\alpha r|}{|\nabla_r g|} \quad |\nabla_\alpha r| = \left|\frac{\partial r}{\partial \alpha}\right|.$$

A continuous measurement model for a configuration of one transmitting finite length element of arbitrary shape and one receiving point source sensor is explained next. In this case, the transmitting element has a finite length and an arbitrary shape. It is characterised by a continuous set of point source locations $X^j$. The measurement model is defined as $$m(p,t) = \iint_{q \in X^j, r \in \Omega} o_d(r,p,q) \gamma(r) v_{pe}(t - t_{Tx}(r,q) - t_{Rx}(r,p)) dr d\sigma(q).$$

It can be seen that the main difference with the model described in connection with the configuration of one transmitting point source element and one receiving point source sensor lies in the fact that there is one more integral, which corresponds to the sum of the contributions of all the point sources which form the finite length sensor of arbitrary shape.

The corresponding parametric formulation is given by:

$$m(p,t) = \iiint_{\tau \in \mathbb{R}, q \in X^j, \alpha \in A} o_d(r(\alpha,p,q,\tau),p,q) \gamma(r(\alpha,p,q,\tau)) |J(\alpha,p,q,\tau)| v_{pe}(t-\tau) d\alpha d\sigma(q) d\tau.$$

A continuous measurement model for a configuration of one transmitting finite length element of arbitrary shape and one receiving finite length sensor is explained next. In this case, the receiving sensor has a finite length and arbitrary shape. It is defined by the set of point source locations $\Pi^i$. The coordinate of the resulting signal is denoted by $m(\xi^i, t)$, where $\xi^i \in \Pi^i$. It can be for example the coordinate of the point in the centre of $\Pi^i$.

It can be written: $m(\xi^i, t) = \int_{p \in \Pi^i} m(p, t) d\sigma(p)$. The resulting measurements are obtained by integrating along the transducer surface defined by $\Pi^i$. When integrating the equation which defines m(p,t) into the above integral, the following relationship holds:

$$m(\xi^i,t) = \iiint_{p \in \Pi^i, q \in X^j, r \in \Omega} o_d(r,p,q) \gamma(r) v_{pe}(t-t_{Tx}(r,q)-t_{Rx}(r,p)) dr d\sigma(q) d\sigma(p).$$

The corresponding parametric formulation is given by:

$$m(\xi^i,t) = \iiint_{\tau \in \mathbb{R}, p \in \Pi^i, q \in X^j, \alpha \in A} o_d(r(\alpha,p,q,\tau),p,q) \gamma(r(\alpha,p,q,\tau)) |J(\alpha,p,q,\tau)| v_{pe}(t-\tau) d\alpha d\sigma(q) d\sigma(p) d\tau.$$

A continuous measurement model for a configuration of multiple transmitting finite length elements of arbitrary shape and one receiving finite length sensor of arbitrary shape is explained next. In this case, a set of point source locations $X^j$ is associated with the transmitting element j, leading to the following equation:

$$m(\xi^i,t) = \sum_{j=1}^{N_{elt}} \iiint_{p \in \Pi^i, q \in X^j, r \in \Omega} o_d(r,p,q) \gamma(r) v_{pe}(t-t_{Tx}(r,q)-t_{Rx}(r,p)) dr d\sigma(q) d\sigma(p).$$

This equation is highly similar to the one described in connection with the configuration of one transmitting finite length elements of arbitrary shape and one receiving finite length sensor of arbitrary shape. The only difference is in the sum that has been introduced to take into account the multiple transmitting elements.

The corresponding parametric formulation is given by:

$$m(\xi^i,t) = \sum_{j=1}^{N_{elt}} \iiint_{\tau \in \mathbb{R}, p \in \Pi^i, q \in X^j, \alpha \in A} o_d(r(\alpha,p,q,\tau),p,q) \gamma(r(\alpha,p,q,\tau)) |J(\alpha,p,q,\tau)| v_{pe}(t-\tau) d\alpha d\sigma(q) d\sigma(p) d\tau.$$

A continuous measurement model for a configuration of multiple transmitting finite length elements of arbitrary shape and multiple receiving finite length sensors of arbitrary shape is explained next.

When a set of multiple receiving sensors is used, a set of point source locations $\Pi^i$ and a coordinate $\xi^i$ is associated with the receiving sensor i. Thus, the receiving measurement field can be defined as $$m(\xi,t) = \sum_{i=1}^{N_{elr}} m(\xi,t) \delta(\xi - \xi^i),$$

which is only defined for discrete coordinates $\xi^i$. In the remainder of the present description, the following holds: $\xi \in P \subset \mathbb{R}^3$.

Figure 4:
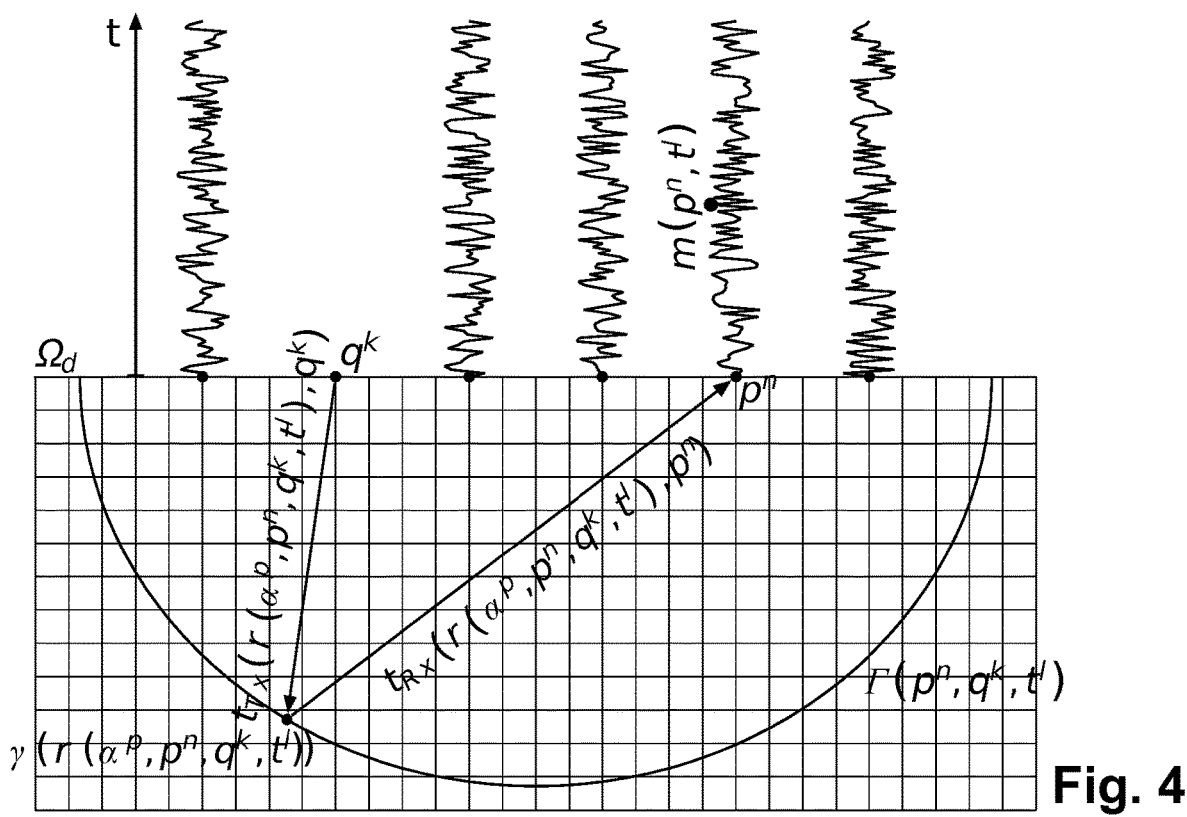
FIG. 4 is a schematic illustration showing the imaging configuration and a discrete domain reflectivity hypersurface used in the proposed imaging method according to an example of the present invention.

The continuous parametric formulation of the measurement model is next discretised. This step consists in discretising the parametric formulation of the measurement model described in connection with the configuration of multiple transmitting finite length elements of arbitrary shape and one receiving finite length sensor of arbitrary shape. However, any of the models described above could be discretised instead. By discretisation, it is meant that we select some discrete values $\alpha^p$ of the parameter $\alpha$, which defines the following set of parameters: $A_d = \{\alpha^p \in A, p = \{1 \ldots N_\alpha\}\}$. It can be seen that the selection of the discrete values of the parameter $\alpha$ leads to a discretisation of the hypersurface $\Gamma(p, q, t)$, which will now be described by only $N_\alpha$ points $(r(\alpha^p, p, q, t))_{\alpha^p \in A_d}$. FIG. 4 schematically illustrates the measurement configuration in discrete domain showing also the reflectivity hypersurface. The discretisation of the parametric formulation of the measurement model can be expressed as:

$$m(\xi^i, t^l) = (\tilde{m}(\xi^i) * v_{pe})(t^l),$$

where $v_{pe} \in \mathbb{R}^{N_t}$ is the pulse shape evaluated at each time sample of the measurement grid and $\tilde{m}(\xi^i) = (\tilde{m}(\xi^i, t^l))_{t^l \in T_d}$ with $$\tilde{m}(\xi^i, t^l) =$$

$$\sum_{j=1}^{N_{elt}} \sum_{q^k \in X_d^j} \sum_{p^n \in \Pi_d^i} \sum_{\alpha^p \in A_d^j} o_d(r(\alpha^p, p^n, q^k, t^l), p^n, q^k) \gamma(r(\alpha^p, p^n, q^k, t^l))$$

$$|J(\alpha^p, p^n, q^k, t^l)| w(q^k) u(\alpha^p),$$

where $w(q^k)$, $u(\alpha^p)$ and $z(p'')$ are integration weights (related to the discretisation of the continuous integrals). It can be noticed that, for each point $q^k$ of the transmitting element, the above equation comprises a set of reflectivity values $(\gamma(r(\alpha^p, p'', q^k t^l)))_{\alpha^p \in A_d^j}$, referred to as hypersurface reflectivity samples or values, which are estimated on the points of the reflectivity hypersurface.

The hypersurface reflectivity values are next interpolated to substantially coincide with the reflectivity grid points. The hypersurface reflectivity values are usually unknown since they do not lie on the reflectivity grid points. Thus, they need to be approximated from the reflectivity samples defined on the reflectivity grid by means of an interpolation kernel as introduced by P. Thévenaz, T. Blu and M. Unser, "Interpolation revisited", IEEE Transactions on Medical Imaging, vol. 19, p. 739-758, 2000. Let us thus introduce the interpolation kernel $\varphi: \Omega \to \mathbb{R}$ such that:

$$\gamma(r(\alpha^p, p'', q^k, t^l)) \approx \sum_{s=1}^{N_\gamma} \gamma^s \varphi(r^s - r(\alpha^p, p'', q^k, t^l)).$$

The above interpolation equation relates the hypersurface reflectivity values $\gamma(r(\alpha^p, p'', q^k, t^l))$ (which are typically not on the reflectivity grid points) to the reflectivity samples $\gamma^s$.

A summation of the discretised and interpolated hypersurface reflectivity samples or values is carried out next. The interpolation equation is inserted into the discretised measurement model and the following summation is performed:

$$\tilde{m}(\xi^i t^l) = \sum_{j=1}^{N_{elr}} \sum_{q^k \in X_d^j} \sum_{p'' \in \Pi_d^j} \sum_{\alpha^p \in A_d^j} i o_d(r(\alpha^p, p'', q^k, t^l),$$
$$p'', q^k)(\sum_{s=1}^{N_\gamma} \gamma^s \varphi(r^s - r(\alpha^p, p'', q^k, t^l)))|J(\alpha^p, p'', q^k, t^l)$$
$$|w(q^k) z(p'') u(\alpha^p).$$

In this example, the output of the summation is eventually convolved with the pulse shape, as described in the previous equations in order to obtain an estimate of the measurement value, also referred to as a measurement value estimate, at the considered measurement grid point. The above described process is carried out for every measurement value. Thus, the outcome of the estimation or processing of the measurement model is the estimate of the measurement value at the respective measurement grid point.

The estimation, evaluation, computation or implementation of the adjoint operator of the measurement model at each reflectivity grid point is carried out next. First, a continuous parametric formulation of the adjoint operator of the measurement model is obtained. The continuous formulation of the adjoint operator can be derived from the measurement model, ie from example from any of the continuous measurement models given above, using functional analysis tools. The equations below are derived from the case of multiple finite length transmitting elements of arbitrary shape and multiple finite length receiving sensors of arbitrary shape. Indeed, if we define an operator $\mathcal{H}: L_2(\Omega) \to L_2(P \times T)$ such that $\mathcal{H}\{\gamma\}(\xi, t) = \sum_{i=1}^{N_{elr}} m(\xi, t) \delta(\xi - \xi^i)$, then the adjoint operator $\mathcal{H}^\dagger: L_2(P \times T) \to L_2(\Omega)$ of $\mathcal{H}$ is defined as:

$$\left\langle n | \mathcal{H}\{\gamma\} \right\rangle_{P \times T} = \left\langle \mathcal{H}^\dagger\{n\} | \gamma \right\rangle_\Omega, \forall n \in L_2(P \times T), \forall \gamma \in L_2(\Omega).$$

Let us consider the following inner product:

$$\langle n | \mathcal{H}\{\gamma\}\rangle_{P \times T} = \int\int_{\xi \in P, t \in T} n(\xi, t) \mathcal{H}\{\gamma\}(\xi, t) d\xi dt$$

$$\langle n | \mathcal{H}\{\gamma\}\rangle_{P \times T} = \int\int_{\xi \in P, t \in T} n(\xi, t) \sum_{i=1}^{N_{elr}} m(\xi, t) \delta(\xi - \xi^i) d\xi dt$$

-continued $$\langle n | \mathcal{H}\{\gamma\}\rangle_{P \times T} = \sum_{i=1}^{N_{el}} \int_{t \in T} n(\xi^i, t) m(\xi^i, t) dt$$

$$\langle n | \mathcal{H}\{\gamma\}\rangle_{P \times T} =$$
$$\sum_{i=1}^{N_{elr}} \int_{t \in T} n(\xi^i, t) \left[ \sum_{j=1}^{N_{elt}} \int\int\int_{q \in X^j, p \in \Pi^i, r \in \Omega} o_d(r, p, q) \gamma(r) v_{pe}(t - $$
$$t_{Tx}(r, q) - t_{Rx}(r, p)) dr d\sigma(q) d\sigma(p) \right] dt$$

$$\langle n | \mathcal{H}\{\gamma\}\rangle_{P \times T} = \int_{r \in \Omega} \gamma(r) \sum_{j=1}^{N_{elt}} \sum_{i=1}^{N_{elr}} \int\int_{q \in X^j, p \in \Pi^i} o_d(r, p, q) \left[ \int_{t \in T} n(\xi^i, t) \right.$$
$$\left. v_{pe}(t - t_{Tx}(r, q) - t_{Rx}(r, p)) dt \right] d\sigma(q) d\sigma(p) dr$$

$$\langle n | \mathcal{H}\{\gamma\}\rangle_{P \times T} = \int_{r \in \Omega} \gamma(r) \left[ \sum_{j=1}^{N_{elt}} \sum_{i=1}^{N_{elr}} \int\int_{q \in X^j, p \in \Pi^i} o_d(r, p, q) \right.$$
$$\left. (n(\xi^i) * u)(t_{Tx}(r, q) + t_{Rx}(r, p)) d\sigma(q) d\sigma(p) \right] dr,$$

where $u(t) = v_{pe}(-t)$ is the matched filter of the pulse echo waveform. We now have:

$$\left\langle n | \mathcal{H}\{\gamma\} \right\rangle_{P \times T} = \int_{r \in \Omega} \gamma(r) \, \mathcal{H}^\dagger\{n\}(r) dr = \left\langle \mathcal{H}^\dagger\{n\} | \gamma \right\rangle_\Omega,$$

where $$\mathcal{H}^\dagger\{n\}(r) = \sum_{j=1}^{N_{elt}} \sum_{i=1}^{N_{elr}} \int\int_{q \in X^j, p \in \Pi^i} i o_d(r, p, q)(n(\xi^i)$$
$$* u)(t_{Tx}(r, q) + t_{Rx}(r, p)) d\sigma(q) d\sigma(p).$$

Equipped with the adjoint operator of the measurement model, we define the estimate of the reflectivity value at the reflectivity grid point r, given an estimate of the measurement value, as:

$$\hat{\gamma}(r) \mathcal{H}^\dagger\{m\}(r)$$

$$\hat{\gamma}(r) = \sum_{j=1}^{N_{elt}} \sum_{i=1}^{N_{elr}} \int\int_{q \in X^j, p \in \Pi^i} o_d(r, p, q)$$
$$(m(\xi^i) * u)(t_{Tx}(r, q) + t_{Rx}(r, p)) d\sigma(q) d\sigma(p).$$

This case is simpler than the measurement model. Indeed, the parametric formulation is direct and the measurement parametric equation can be expressed as a simple time-of-flight equation:

$$t = t_{Tx}(r, q) + t_{Rx}(r, p).$$

The measurement hypersurface corresponding to the above equation is then:

$$(t, p) \in \hat{\Gamma}(r, q) \Leftrightarrow \begin{cases} p \in \prod^i \\ t = t_{Tx}(r, q) + t_{Rx}(r, p) \end{cases}.$$

The parametric formulation of the adjoint operator of the measurement model is next discretised. The same process is applied as for the discretisation of the measurement model. In this case, the discretisation process is more direct since it is directly applied onto p. The discretised set of parameters is $\Pi_d^i$. We thus have the following equation:

$$\hat{\gamma}(r)=\sum_{j=1}^{Nelt}\sum_{i=1}^{Nelr}\sum_{q^k \in X_d}\sum_{p^n \in \Pi_d^j}(m(\xi^i)*u)(t_{Tx}(r,q^k)+t_{Rx}(r,p^n))o_d(r,p^n,q^k)w(q^k)z(p^n),$$

where $w(q^k)$ and $z(p^n)$ are integration weights, $m(\xi^i)=(m(\xi^i, t^l))_{t^l \in T_d}$ and $u \in \mathbb{R}^{N_t}$ is the matched filter of the pulse shape evaluated at each time sample. It can be noticed that the above equation comprises a set of convolved measurement samples $((m(\xi^i)*u)(t_{Tx}(r, q^k)+t_{Rx}(r, p^n)))_{p^n \in \Pi_d^j}$, referred to as hypersurface measurement samples or values, which line on the measurement hypersurface.

An interpolation of the hypersurface measurement samples to substantially coincide with the measurement grid points is carried out next. The values of the hypersurface measurement samples are usually unknown since they do not lie on the measurement grid points. Thus, they need to be approximated from the measurement samples defined on the measurement grid by means of an interpolation kernel. Let us introduce the interpolation kernel $\psi: \mathbb{R} \to \mathbb{R}$ such that:

$$(m(\xi^i)*u)(t_{Tx}(r,q^k)+t_{Rx}(r,p^n)) \approx \sum_{l=1}^{N_t}(m(\xi^i)*u)(t^l)\psi(t^l-t_{Tx}(r,q^k)+t_{Rx}(r,p^n)).$$

The above equation relates the hypersurface measurement samples $(m(\xi^i)*u)(t_{Tx}(r, q^k)+t_{Rx}(r, p^n))$ to the convolved measurement samples $(m(\xi^i)*u)(t^l)$.

After this, the discretised and interpolated hypersurface measurement samples are summed. The interpolation equation is inserted into the discretised adjoint operator of the measurement model and the following summation is performed:

$$\hat{\gamma}(r)=\sum_{j=1}^{Nelt}\sum_{i=1}^{Nelr}\sum_{q^k \in X_d}\sum_{p^n \in \Pi_d^j}(\sum_{l=1}^{N_t}(m(\xi^i)*u)(t^l\psi(t^l-t_{Tx}(r,q^k)-t_{Rx}(r,p^n)))o_d(r,p^n,q^k)w(q^k)z(p^n).$$

The output of the summation is the estimate of the reflectivity value at the considered reflectivity grid point.

The image reconstruction procedure is explained next. The inverse problem is defined first. The measurement values m can be used to generate an estimate of the reflectivity values $\hat{\gamma}$ using the adjoint operator of the measurement model as described above. Similarly, an estimate of the reflectivity values $\hat{\gamma}$ can be used to generate an estimate of the measurement values $\hat{m}$, which are not equal to m, using the measurement model described earlier. Thus, we now know the relationships between the estimates of the measurement and reflectivity values.

The image reconstruction method aims to retrieve an estimate $\hat{\gamma}$ of the reflectivity values evaluated at the reflectivity grid points, given the set of measurements values m. The relationship between the measurement values and the unknown reflectivity values is defined by the following linear inverse problem:

$$m = \begin{pmatrix} \mathcal{H}\{\gamma\}(p^1, t^1) \\ \vdots \\ \mathcal{H}\{\gamma\}(p^{Nel}, t^{N_t}) \end{pmatrix},$$

which corresponds to the measurement model estimated at each point of the measurement grid.

Moreover, since the operator $\mathcal{H}\{\gamma\}(p^n, t^l)$ is linear with respect to $\gamma$ (can be deduced from the formulae described when evaluating the measurement model at a given grid point), there exists a matrix $H \in \mathbb{R}^{N_{el}N_t \times N_\gamma}$ (associated with the linear operator $\mathcal{H}$) such that $$m = H\gamma,$$

which defines the inverse problem.

The optimisation problem associated with the inverse problem is explained next. In order to solve the above inverse problem, it is expressed as the following optimisation problem:

$$\min_\gamma \mathcal{J}(\gamma, m) = \mathcal{F}(H\gamma, m) + \lambda \mathcal{R}(\gamma),$$

where $\mathcal{J}(\gamma, m)$ denotes the objective function involved in the optimisation problem, $\mathcal{F}(H\gamma, m)$ is a lower semicontinuous functional accounting for the data discrepancy term, measuring the distance between the estimate of the measurement values $H\gamma$ and the measurement values m, $\mathcal{R}(\gamma)$ is a lower semicontinuous functional describing an optional prior term, which accounts for additional information such as a specific statistical behaviour, on the reflectivity values and $\lambda > 0$ is a regularisation parameter.

Some examples of the functionals used for the data discrepancy term are listed below:

Euclidean distance: $\mathcal{F}(H\gamma, m) = \|H\gamma - m\|_2^2$;

Indicator function on the $\ell_2$-ball of radius $\epsilon$:

$$i_\epsilon(\gamma) = \begin{cases} 0 & \text{if } \|H\gamma - m\|_2 < \epsilon \\ +\infty & \text{otherwise} \end{cases};$$

$\ell_1$-norm: $\mathcal{F}(H\gamma, m) = \|H\gamma - m\|_1$.

Some examples of the functionals used for the prior term are listed below:

$\ell_p$-norm to the power of p: $\mathcal{R}(\gamma) = \|\gamma\|_p^p$,
  when $p < 1$, it is a measure of sparsity of $\gamma$.
  when $p \in [1,2]$, it is a measure of how well the data fit to the generalised Gaussian distribution (GGD).

$\ell_p$-norm to the power of p in a given model $\Psi$: $\mathcal{R}(\gamma) = \|\Psi\gamma\|_p^p$
  $\Psi$ can be a general transform such as the wavelet transform or the Fourier transform.
  $\Psi$ can be a learned dictionary.

It is next explained how the optimisation problem can be solved with one image prior. Depending on the properties of $\mathcal{F}$ and $\mathcal{R}$, different types of algorithms may be used.

A case where $\mathcal{F}$ and $\mathcal{R}$ are differentiable is explained next. In this case, the inverse problem is solved by finding the roots of the derivative of the objective function $\mathcal{J}(\gamma, m)$ with respect to $\gamma$, which can be written as $$\frac{\partial \mathcal{F}(H\gamma, m)}{\partial \gamma} + \lambda \frac{\partial \mathcal{R}(\gamma)}{\partial \gamma} = 0.$$

It can be seen that the problem involves the computation of H in the calculation of the derivative of $\mathcal{F}(H\gamma, m)$. Depending on the function $\mathcal{F}(H\gamma, m)$, the calculation of the derivative may also involve the computation of the adjoint operator of the measurement model H. One famous example of such a problem is the Tikhonov regularisation, where $\mathcal{R}(\gamma) = \|\gamma\|_2^2$ and $\mathcal{F}(H\gamma, m) = \|H\gamma - m\|_2^2$. In this case, we have the following solution: $\hat{\gamma} = (I + H^\dagger H)^{-1} H^\dagger m$, where $I \in \mathbb{R}^{N_\gamma \times N_\gamma}$ is the identity matrix, the $N_\gamma \times N_\gamma$ square matrix with ones on the main diagonal and zeros elsewhere.

A case where only $\mathcal{F}$ is differentiable and $\mathcal{R}$ is convex is explained next. One popular group of methods used to solve such problems are called projected gradient methods. Projected gradient methods exploit the fact that the solution of the optimisation problem satisfies a fixed-point equation. One popular algorithm is forward-backward splitting which involves the following system of fixed-point equations, limited to one equation in this specific example:

$$\hat{\gamma} = prox_{\tau\mathcal{R}}\left(\hat{\gamma} - \tau\frac{\partial \mathcal{F}(H\gamma, m)}{\partial \gamma}(\hat{\gamma}, m)\right),$$

where $$prox_{\tau\mathcal{R}}(x) = \operatorname*{argmin}_{y}\frac{1}{2}\|y - x\|_2^2 + \tau\mathcal{R}(x)$$

denotes the proximity operators associated with $\mathcal{R}$, the proximity operator being introduced by P. Combettes and J.-C. Pesquet, "Proximal Splitting Methods in Signal Processing", Fixed-Point Algorithms for Inverse Problems in Science and Engineering, p. 185-212, 2011. The above equation is denoted as a fixed-point equation since $\hat{\gamma}$ appears on both sides of the equation. Thus, the problem is solved by carrying out the following iterations:

$$\overline{\gamma^{n+1}} = prox_{\tau\mathcal{R}}\left(\overline{\gamma^n} - \tau\frac{\partial \mathcal{F}(H\gamma, m)}{\partial \gamma}(\overline{\gamma^n}, m)\right)$$

until a convergence criterion is reached.

Another popular algorithm is the fast iterative shrinkage-thresholding algorithm (FISTA), introduced by A. Beck and M. Teboulle, "A Fast Iterative Shrinkage-Thresholding Algorithm for Linear Inverse Problems", SIAM Journal on Imaging Science, vol. 2, p. 183-202, 2009, which is a variant of the method described above.

One example of the forward-backward splitting is when $\mathcal{R}(\gamma)=\|\gamma\|_1$ and $\mathcal{F}(H\gamma, m)=\|H\gamma-m\|_2^2$. In this case, the following iteration is performed:

$$\overline{\gamma^{n+1}} = \operatorname{soft}(\overline{\gamma^n} - 2\tau''H^\dagger(H\overline{\gamma^n} - m), \tau''),$$

where $\tau'' \in \mathbb{R}_+$ is a hyper-parameter.

Indeed, the proximity operator associated with the $\ell_1$-norm is defined as $prox_{\tau\|\cdot\|_1}(x)=\operatorname{soft}(x, \tau)$, where the soft-thresholding operator is defined element-wise as: $\operatorname{sign}(x_i) \max(|x_i|-\tau, 0)$, where $\operatorname{sign}(x_i)$ is equal to 1 when $x_i>0$, 0 when $x_i=0$ and $-1$ otherwise.

A case where $\mathcal{F}$ and $\mathcal{R}$ are not differentiable is explained next. In this case, several methods can be used, such as alternating direction method of multipliers (ADMM) introduced by S. Boyd, N. Parikh, E. Chu, B. Peleato and J. Eckstein, "Distributed Optimization and Statistical Learning via the Alternating Direction Method of Multipliers", Foundations and Trends in Machine Learning, vol. 3, p. 1-122, 2011, or primal-dual forward-backward (PDFB) algorithm introduced by P. Combettes, L. Condat, J.-C. Pesquet and BC Vu, "A forward-backward view of some primal-dual optimization methods in image recovery", Proceedings of the 2014 IEEE International Conference on Image Processing, p. 4141-4145, 2014.

It is next explained how the optimisation problem with M image priors can be solved. In this case it can be considered that the prior term can be written as:

$$\mathcal{R}(\gamma) = \sum_{k=1}^{M} \mathcal{R}_k(\gamma).$$

In this case, several algorithms can be used such as: primal-dual forward-backward, parallel proximal algorithm (PPXA) introduced by N. Pustelnik, C. Chaux and J.-C. Pesquet, "Parallel Proximal Algorithm for Image Restoration Using Hybrid Regularization", IEEE Transactions on Image Processing, vol. 20, p. 2450-2462, 2011, or simultaneous direction method of multipliers (SDMM) introduced by S. Setzer, G. Steidl and T. Teuber, "Deblurring Poissonian Images by Split Bregman Techniques", Journal of Visual Communication and Image Representation, vol. 21, p. 193-199, 2010. The common properties of these algorithms are that they require the computation of the proximity operator of $\mathcal{F}(H\gamma, m)$ (or the derivative of $\mathcal{F}(H\gamma, m)$) and of the M image prior terms. The computation of the derivative or the proximity operator of $\mathcal{F}(H\gamma, m)$ may involve the estimation of the measurement model and the adjoint operator of the measurement depending on the function $\mathcal{F}(H\gamma, m)$.

Figure 5:
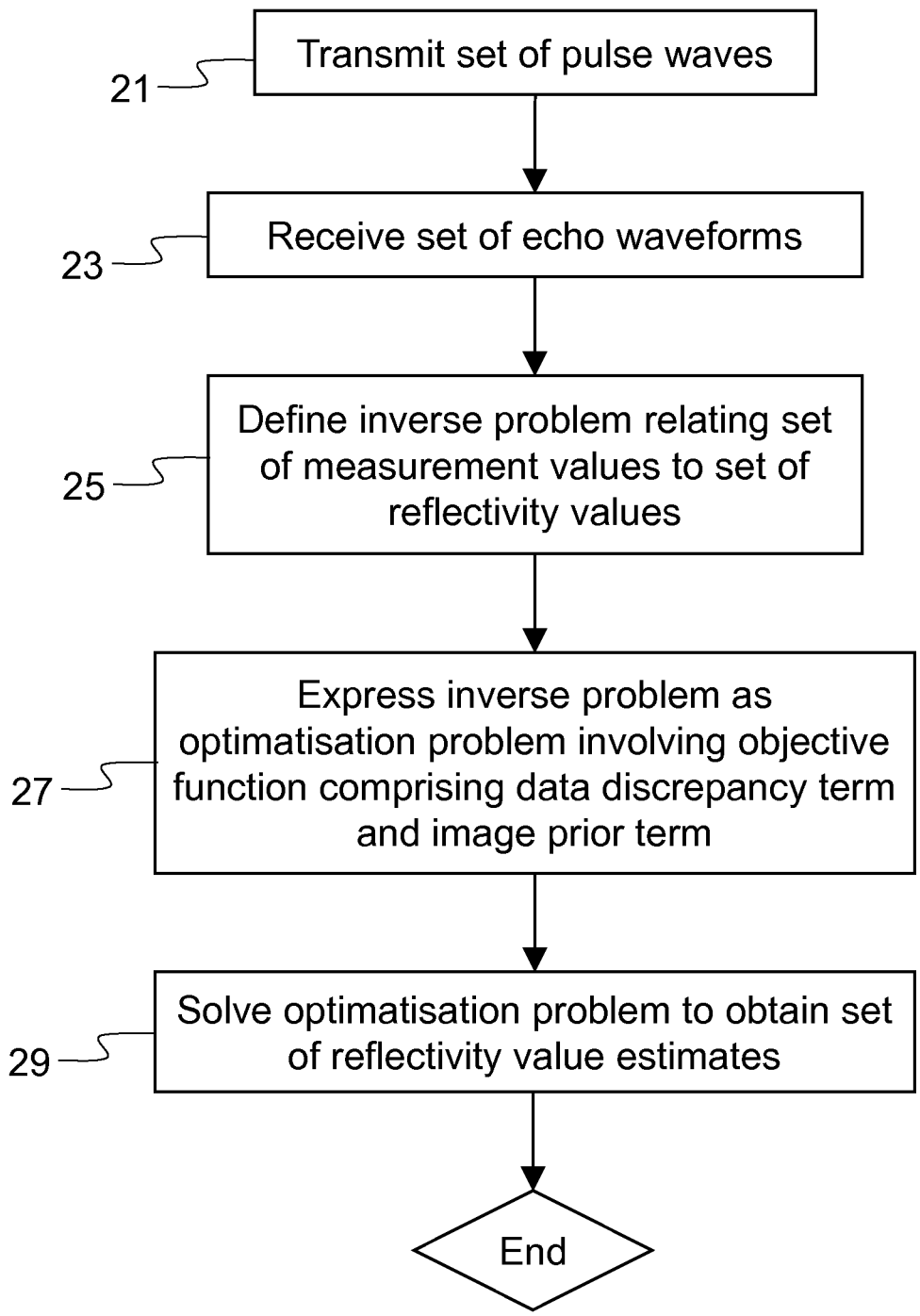
FIG. 5 is a flow chart summarising the image reconstruction method according to an example of the present invention.

The above described image reconstruction method can be summarised by the flow charts of FIGS. 5 to 9. The flow chart of FIG. 5 gives an overview of the method. In step 21, a set of pulse waves is transmitted by a set of transmitting elements. In this example, the transmitting elements have a finite size and arbitrary shape. The set of transmitted pulses may comprise only one pulse or more than one pulses transmitted in a sequence. In step 23, a set of reflected echo waveforms is received by a set of sensors, which in this example have a finite size and arbitrary shape. In step 25, the inverse problem relating the set of measurement values to the set of reflectivity values is defined. In step 27, the solution of the inverse problem is expressed as an optimisation problem involving an objective function comprising a data discrepancy term and one or more image prior terms. In step 29, the optimisation problem is solved by using projections to obtain an estimate of the reflectivity values.

Figure 6:
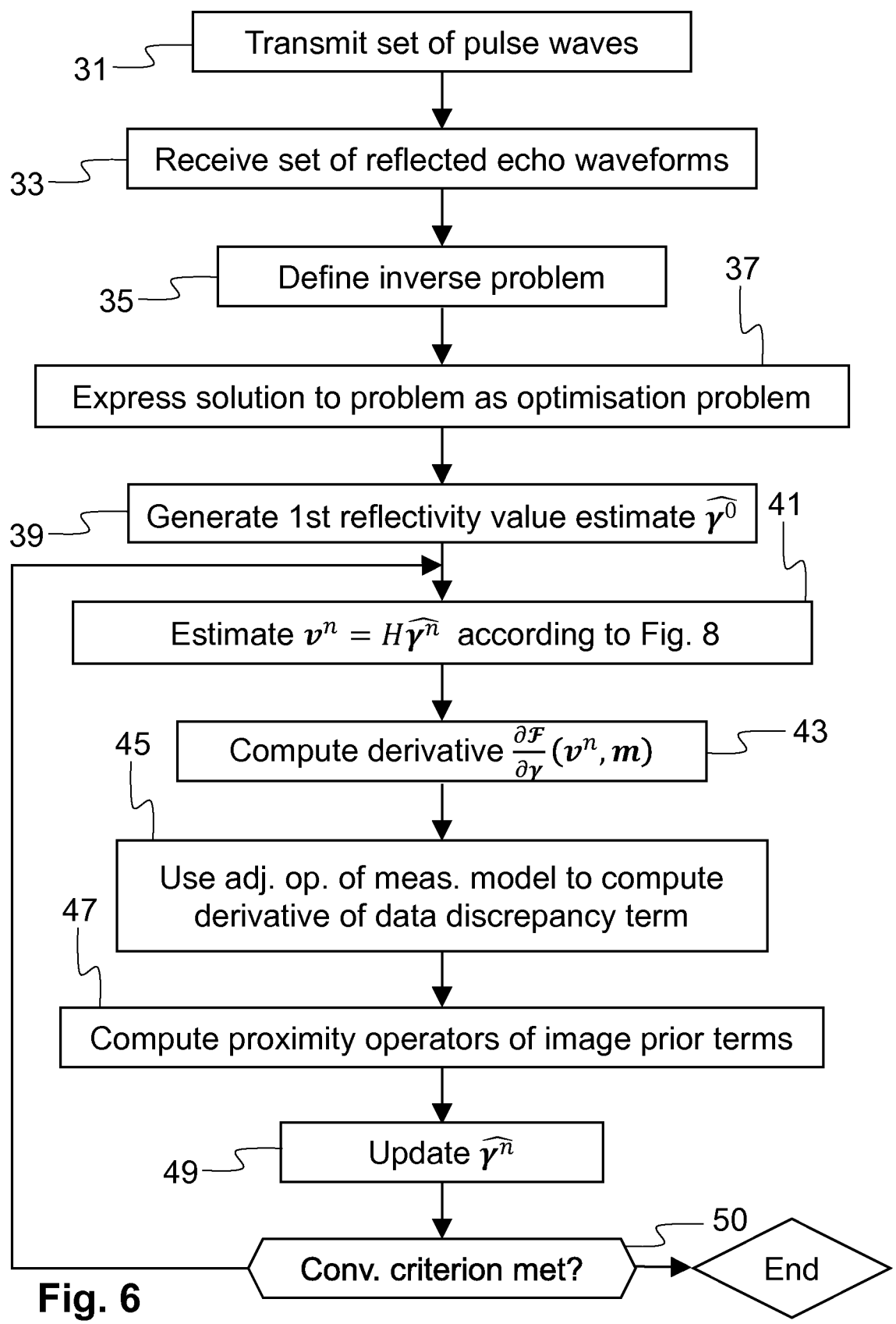
FIG. 6 is a flow chart illustrating the image reconstruction method in more detail according to an example of the present invention.

The flow chart of FIG. 6 outlines the proposed method in more detail in the case where the functional $\mathcal{F}$ is differentiable. The first four steps, ie steps 31, 33, 35 and 37 are the same as the first four steps in the flow chart of FIG. 6. In step 39, a first reflectivity value estimate $\overline{\gamma^n} = H^\dagger m$ is computed by estimating the adjoint operator of the measurement model on the measurement values m as an initialisation. In step 41, the variable $v^n = H\overline{\gamma^n}$ is computed or estimated according to the flow chart of FIG. 8. In step 43, the derivative $$\frac{\partial \mathcal{F}}{\partial \gamma}(v^n, m)$$

is computed. In certain implementation examples, in step 45, the adjoint operator is used to compute the derivative of the data discrepancy term. For instance, when $\mathcal{F}(H\gamma, m)=\|H\gamma-m\|_2^2$, the derivative of $\mathcal{F}(H\gamma, m)$ is expressed as:

$$\frac{\partial \mathcal{F}}{\partial \gamma}(v^n, m) = H^\dagger(v^n - m),$$

which involves the computation of the adjoint operator of the measurement model. In step 47, the proximity operators of the image prior terms are computed. In step 49, $\overline{\gamma^n}$ is updated. In step 50, it is determined whether or not a convergence criterion is fulfilled. In the affirmative, the process comes to an end. If the criterion is not fulfilled, then the process continues in step 41.

Figure 7:
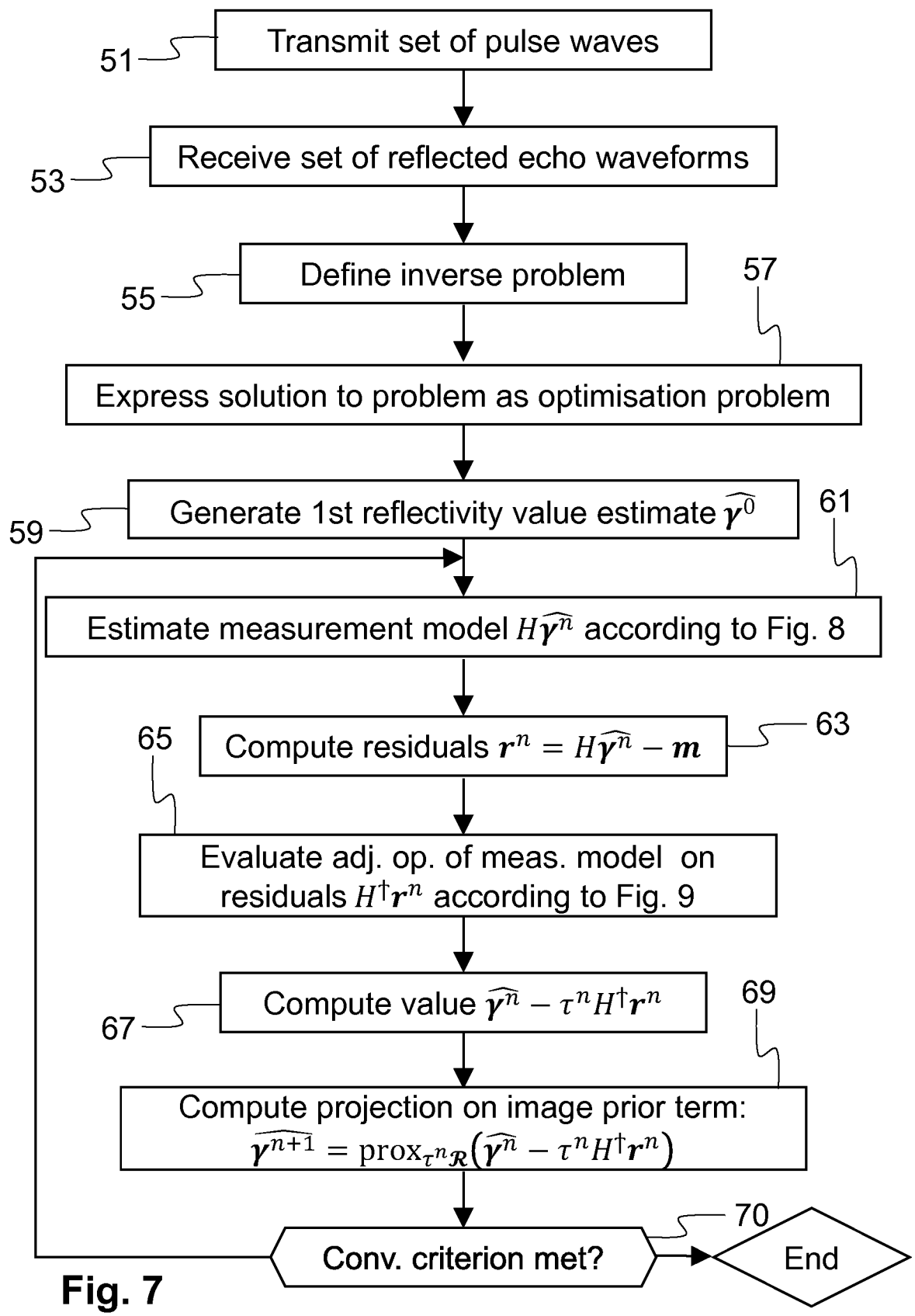
FIG. 7 is a flow chart illustrating the image reconstruction method in more detail according to another example of the present invention.

The flow chart of FIG. 7 outlines the proposed method in more detail in the case where the data discrepancy term is the Euclidean distance and where the inverse problem contains one image prior term. The first five steps, ie steps 51, 53, 55, 57, 59 are substantially the same as the first five steps in the flow chart of FIG. 6 with the difference that now the inverse problem comprises one image prior term. In step 61, the variable $v^n = H\bar{r}^n$ is computed for each measurement grid point according to the flow chart of FIG. 8. In step 63, the residuals $r^n = v^n - m$ are computed. In step 65, the adjoint operator of the measurement model on the residuals $H^\dagger r^n$ is estimated according to the flow chart of FIG. 10. In step 67, the value $\bar{r}^n - \tau^n H^\dagger r^n$ is computed. In step 69, the projection on the image prior term $\bar{r}^{n+1} = \text{prox}_{\tau^n \mathcal{R}}(\bar{r}^n - \tau^n H^\dagger r^n)$ is computed. In step 70, it is determined whether or not a convergence criterion is fulfilled. In the affirmative, the process comes to an end. If the criterion is not fulfilled, then the process continues in step 61.

Figure 8:
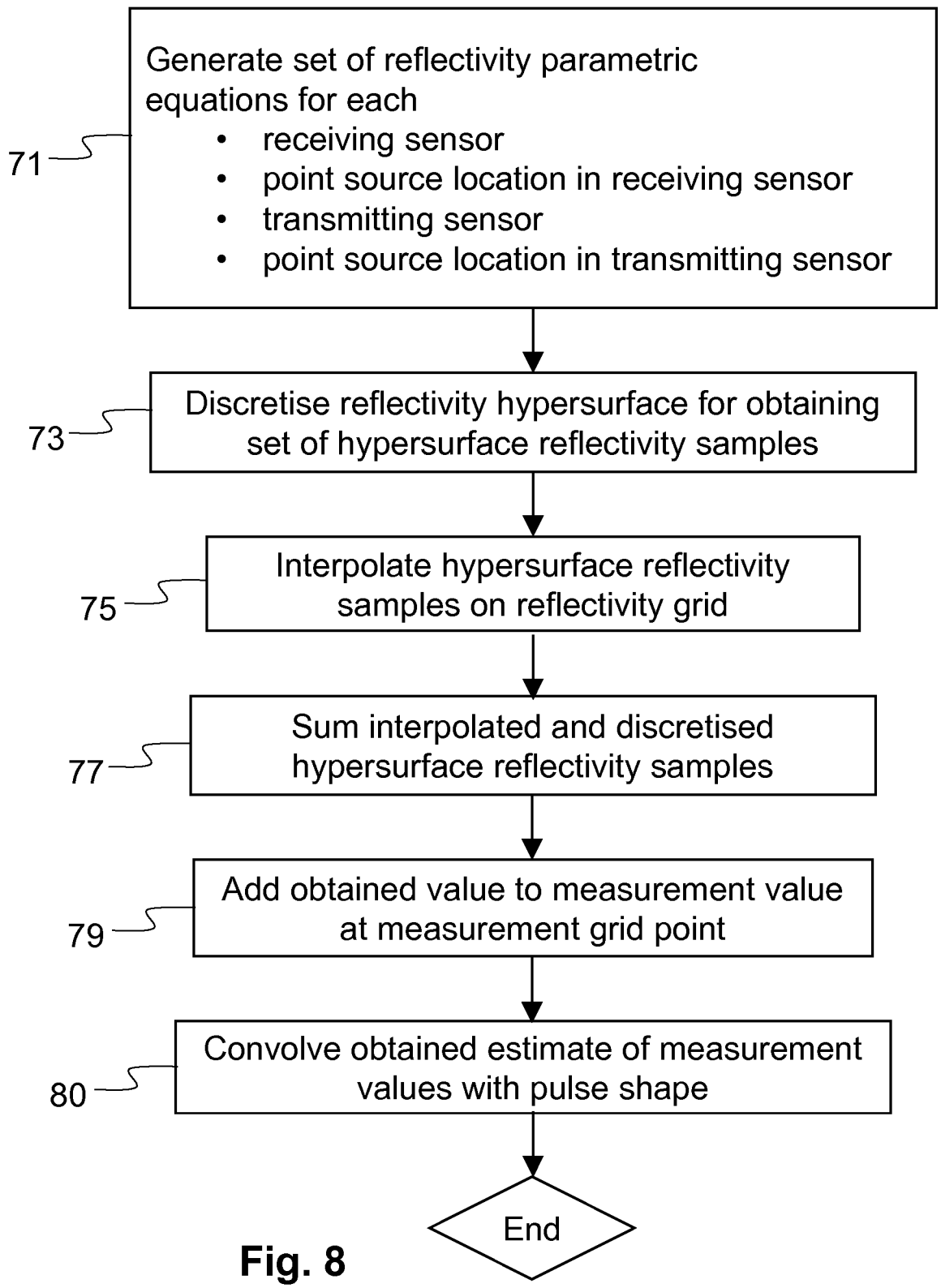
FIG. 8 is a flow chart illustrating a process of implementing an image measurement model according to an example of the present invention.

The flow chart of FIG. 8 explains an example process of estimating or processing the measurement model. In step 71, a set of reflectivity parametric equations are generated for each measurement grid point (defining a finite size receiving sensor of arbitrary shape), for each point source location in the finite size receiver of arbitrary shape corresponding to the measurement grid point, for each finite size transmitter of arbitrary shape and for each point source location in the finite size transmitter of arbitrary shape. In other words, a set of reflectivity parametric equations is generated for each transmitter-receiver wave path between every pair of the point sources in each transmitter and each receiver. The reflectivity parametric equations define a set of reflectivity hypersurfaces. In step 73, the reflectivity hypersurface is discretised to obtain a set of hypersurface reflectivity samples. In step 75, the hypersurface reflectivity samples are interpolated on the reflectivity grid. In step 77, the interpolated and discretised hypersurface reflectivity samples are summed. In step 79, the value obtained in step 77 is added to the measurement value estimate at the point of the measurement grid. In step 80, the obtained accumulated measurement value estimate is convolved with the pulse shape.

The flow chart of FIG. 9 explains an example process of estimating or processing the adjoint operator of the measurement model. In step 81, the measurement value estimates are convolved with the matched filter of the pulse shape. In step 83, a set of measurement parametric equations are generated for each point of the reflectivity grid, for each finite size transmitter of arbitrary shape, for each finite size receiver of arbitrary shape, for each point source location in the finite size transmitter of arbitrary shape and for each point source location in the finite size receiver of arbitrary shape. In other words, a set of measurement parametric equations is generated for each transmitter-receiver path between every pair of the point sources in each transmitter and each receiver. The measurement parametric equations define a set of measurement hypersurfaces. In step 85, the measurement hypersurface is discretised to obtain a set of hypersurface measurement samples. In step 87, the hypersurface measurement samples are interpolated on the measurement grid. In step 89, the interpolated and discretised hypersurface measurement samples are summed. In step 90, the value obtained in step 89 is added to the reflectivity value estimate at the point of the reflectivity grid.

The transmitted pulse waves can be generated by at least one electromechanical transduction device excited by an electrical signal. The measurement values can be obtained from an electrical signal generated by at least one reciprocal electromechanical transduction device. The electromechanical transduction devices are spatially arranged into: one or more linear array probes with a multi-element structure with a substantially one-wavelength-pitch, and aligned along a straight, convex or concave line; one or more phased array probes with a multi-element structure with a substantially half-wavelength-pitch, and aligned along a straight, convex or concave line; one or more matrix array probes with a multi-element structure with a substantially one-wavelength-pitch, and aligned on a planar surface; or one or more matrix array probes with a multi-element structure with a substantially half-wavelength-pitch, and aligned on a planar surface.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

For example, the teachings of the present invention can be applied to photoacoustic imaging, where the transmit acoustic waves are replaced with electromagnetic-radiation pulses. In this particular case, the whole formalism introduced in the present description can be simplified by setting all acoustic transmission propagation delays to zero, because electromagnetic radiation propagates at a speed close to the speed of light, ie typically five orders of magnitude faster than the speed of sound. For this reason, the transmission propagation delays can thus be neglected when accounting the acoustic propagation delays on reception. Another modification considered in the present invention is in the use of transducer technologies different from piezoelectric materials, such as capacitive machined ultrasound transducers (CMUTs). Yet another modification is to apply the invention in a time-multiplexed scheme, whereby subsets of transmitting and/or receiving transducer elements are successively addressed in sequence, and the resulting signals are stored for subsequent recombination. All the above applications can also be translated to microbubble based contrast specific nonlinear imaging techniques known in the art, such as pulse inversion, amplitude modulation, amplitude modulation pulse inversion, harmonic imaging etc.

The present invention also proposes a computer program product comprising instructions stored on a non-transitory medium for implementing the steps of the method as explained above when loaded and run on computing means of an electronic data processing device, such as the imaging apparatus 1.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A pulse wave image reconstruction method comprising:
    transmitting a set of pulse waves to an object to be at least partially reconstructed by a set of transmitting elements;
    receiving a set of reflected echo waveforms, by a set of sensors, from the object characterised by a set of reflectivity values defined on a reflectivity grid comprising reflectivity grid points, the set of echo waveforms defining a set of measurement values defined on a measurement grid comprising measurement grid points;

defining an inverse problem for obtaining a set of reflectivity value estimates from the set of measurement values by a measurement model;

expressing the inverse problem as an optimisation problem involving an objective function comprising a data discrepancy term;

expressing the optimisation problem as a system of equations involving contributions of the data discrepancy term;

obtaining the set of reflectivity value estimates by performing iterations in the system of equations until a given convergence threshold has been reached, at least some of the iterations involving at least a measurement value estimate for each measurement grid point of a set of measurement grid points and a reflectivity value estimate for each reflectivity grid point of a set of reflectivity grid points;

wherein obtaining the contributions in the system of equations comprises:

obtaining the measurement value estimate for each measurement grid point of the set of measurement grid points from the measurement model, comprising:

generating a set of reflectivity parametric equations per transmitting element-sensor path defining a set of reflectivity hypersurfaces comprising hypersurface reflectivity values;

integrating the hypersurface reflectivity values over each reflectivity hypersurface of the set of reflectivity hypersurfaces to obtain the measurement value estimate for the respective measurement grid point;

obtaining the reflectivity value estimate for each reflectivity grid point of the set of reflectivity grid points from an adjoint operator of the measurement model, comprising:

generating a set of measurement parametric equations per transmitting element-sensor path defining a set of measurement hypersurfaces comprising hypersurface measurement values;

integrating the hypersurface measurement values over each measurement hypersurface of the set of measurement hypersurfaces to obtain the reflectivity value estimate for the respective reflectivity grid point.

2. The method according to claim 1, wherein each transmitting element of the set of transmitting elements is considered as a set of transmitting point sources, while each sensor of the set of sensors is considered as a set of receiving point sources.

3. The method according to claim 1, wherein, before integrating the hypersurface reflectivity values, the method further comprises:

discretising each reflectivity hypersurface of the set of reflectivity hypersurfaces to obtain the hypersurface reflectivity values;

interpolating the discretised hypersurface reflectivity values to substantially coincide with the reflectivity grid points.

4. The method according to claim 1, wherein, before integrating the hypersurface measurement values, the method further comprises:

discretising each measurement hypersurface of the set of measurement hypersurfaces to obtain the hypersurface measurement values;

interpolating the discretised hypersurface measurement values to substantially coincide with the measurement grid points.

5. The method according to claim 1, wherein the data discrepancy term is expressed as a positive functional evaluating a distance between the measurement value and the measurement value estimate for each measurement grid point of the set of measurement grid points.

6. The method according to claim 5, wherein the positive functional is a positive differentiable functional.

7. The method according to claim 1, wherein the objective function is expressed as a combination of the data discrepancy term and at least one image prior term, the image prior term comprising prior information on the reflectivity values.

8. The method according to claim 7, wherein the at least one image prior term is expressed as the $l_p$-norm to the power of p of the representation of the set of reflectivity value estimates in a given model, the $l_p$-norm being defined for a vector a as $\alpha \in \mathbb{R}^N$ as $$\|a\|_p = \sqrt[p]{\sum_{i=1}^{N} |a_i|^p},$$

where R denotes the space of real numbers.

9. The method according to claim 1, wherein the pulse waves are pulse acoustic waves or electromagnetic-radiation waves.

10. The method according to claim 1, wherein the pulse waves comprise a set of steered plane waves or a set of diverging waves.

11. The method according to claim 1, wherein the pulse waves are generated by at least one electromechanical transduction device excited by an electrical signal, and the measurement values are obtained from an electrical signal generated by at least one reciprocal electromechanical transduction device.

12. The method according to claim 11, wherein the electromechanical transduction devices are spatially arranged into a linear array probe with a multi-element structure with a substantially one-wavelength-pitch, and aligned along a straight, convex or concave line;

a phased array probe with a multi-element structure with a substantially half-wavelength-pitch, and aligned along a straight, convex or concave line;

a matrix array probe with a multi-element structure with a substantially one-wavelength-pitch, and aligned on a planar surface; or a matrix array probe with a multi-element structure with a substantially half-wavelength-pitch, and aligned on a planar surface.

13. The method according to claim 1, wherein the reflectivity and measurement hypersurfaces have a conical shape when the set of reflectivity values lie in a 2D space, and a quadric shape when the set of reflectivity values lie in a 3D space.

14. The method according to claim 1, wherein the integration of the hypersurface measurement or reflectivity values is achieved by numerical integration, and wherein the method further comprises: adding the obtained measurement value estimate to the previous measurement value estimate at the respective measurement grid point to obtain an accumulated measurement value estimate; and convolving the accumulated measurement value estimate with the pulse shape of the transmitted pulse wave.

15. An imaging apparatus for reconstructing an image of an object, the apparatus being configured to perform operations comprising:

transmit a set of pulse waves to an object to be at least partially reconstructed by a set of transmitting elements;

receive a set of reflected echo waveforms, by a set of sensors, from the object characterised by a set of reflectivity values defined on a reflectivity grid comprising reflectivity grid points, the set of echo waveforms defining a set of measurement values defined on a measurement grid comprising measurement grid points;

define an inverse problem for obtaining a set of reflectivity value estimates from the set of measurement values by a measurement model;

express the inverse problem as an optimisation problem involving an objective function comprising a data discrepancy term;

express the optimisation problem as a system of equations involving contributions of the data discrepancy term;

obtain the set of reflectivity value estimates by performing iterations in the system of equations until a given convergence threshold has been reached, at least some of the iterations involving at least a measurement value estimate for each measurement grid point of a set of measurement grid points and a reflectivity value estimate for each reflectivity grid point of a set of reflectivity grid points;

wherein for obtaining the contributions in the system of equations, the apparatus is configured to perform operations comprising:

obtain the measurement value estimate for each measurement grid point of the set of measurement grid points from the measurement model, the measurement value estimate being configured to be obtained by:

generating a set of reflectivity parametric equations per transmitting element-sensor path defining a set of reflectivity hypersurfaces comprising hypersurface reflectivity values;

integrating the hypersurface reflectivity values over each reflectivity hypersurface of the set of reflectivity hypersurfaces to obtain the measurement value estimate for the respective measurement grid point;

obtain the reflectivity value estimate for each reflectivity grid point of the set of reflectivity grid points from an adjoint operator of the measurement model, the reflectivity value estimate being configured to be obtained by:

generating a set of measurement parametric equations per transmitting element-sensor path defining a set of measurement hypersurfaces comprising hypersurface measurement values;

integrating the hypersurface measurement values over each measurement hypersurface of the set of measurement hypersurfaces to obtain the reflectivity value estimate for the respective reflectivity grid point.

* * * * *